Patented May 28, 1935

2,002,988

UNITED STATES PATENT OFFICE 2,002,988

PREPARATION OF METHYL-ANTHRA-QUINONE

Louis Spiegler, South Milwaukee, Wis., assignor to E. I. du Pont de Nemours & Company, Wilmington, Del., a corporation of Delaware No Drawing. Application January 19, 1934, Serial No. 707,335

5 Claims. (Cl. 260—57)

This invention relates to an improvement in the process for preparing methyl-anthraquinone and more particularly to a new and improved process for its purification.

Crude methyl-anthraquinone, as it is obtained from the ring-closure of 4'-methyl-2-benzoyl-benzoic acid, is a dark colored product, varying from a dull gray to a deep pink, even when it is prepared from very pure toluene and phthalic anhydride. It dissolves in sulfuric acid in an almost black solution.

Anthraquinone and its simple substitution derivatives, such as methyl- and chloro-anthraquinone, obtained from ortho-benzoyl-benzoic acid and its derivatives, have been purified according to known literature by various methods, such as sublimation; crystallization from organic solvents or from 50–75% sulfuric acid; by boiling with dilute alkali, or by a vatting procedure. The purification of anthraquinone itself by catalytic oxidation has also been described in U. S. Patent 1,844,389, and the purification of certain ortho-benzoyl-benzoic acids by treatment with alkaline oxidizing agents is described in U. S. Patent 1,845,751. I have found that the purification of methyl-anthraquinone by sublimation is costly and requires special equipment. When recrystallized from organic solvents or sulfuric acid, or when purified by vatting, or by the use of dilute alkalies, it is not obtained in sufficiently pure form to be used in the preparation of certain dyestuffs.

I have discovered that this crude methyl-anthraquinone obtained by dilution of the ring-closed 4'-methyl-2-benzoyl-benzoic acid may be purified to a high degree by treating the crude cake in dilute acid or alkaline solution with an oxidizing agent. The resulting product, after isolation, is light in color, giving, when dissolved in concentrated sulfuric acid, a pale amber colored solution which compares very closely with the product obtained by sublimation, having a crystallizing point of 173–174° C. This result was not to be expected, for it is generally acknowledged that methyl groups are attacked by oxidizing agents to form aldehyde and acid products, and it is known that methyl-anthraquinone can be converted to anthraquinone carboxylic acid by heating in concentrated sulfuric acid with manganese dioxide.

The following examples are given to more fully illustrate my invention. Parts given are by weight.

Example 1

Crude 2-methyl-anthraquinone cake, dry, crystallizing point 168.3° C. (as obtained by the ring-closure of 500 parts of 4'-methyl-2-benzoyl-benzoic acid with 5000 parts of 10% oleum followed by dilution with 20,000 parts of water and filtration from acid bearing liquor) is treated with 100 parts of sodium dichromate, 8000 parts of water and 460 parts of 93% sulfuric acid at 90–95° C. for 10–12 hours. Filtration gives in good yield a product which crystallizes at 173.8° C.–174° C. (dry); and which compares favorably with sublimed material.

Example 2

Crude 2-methyl-anthraquinone (filter cake), (obtained as in Example 1 from 500 parts of 4'-methyl-2-benzoyl-benzoic acid) agitated at 90–95° C. with 8000 parts of water, and 200 parts of 63% nitric acid, yields 2-methyl-anthraquinone of good color and high purity.

Example 3

50 parts of crude 2-methyl-anthraquinone, C. P. 172°, (as obtained from the ring-closure of 4'-methyl-2-benzoyl-benzoic acid and precipitation from 77% sulfuric acid, are heated at 80–90° C. for 10–12 hours with 3 parts of sodium perborate, 0.5 part of sodium hydroxide, and 500 parts of water. Filtration and washing with water yields after drying 48 parts of purified 2-methyl-anthraquinone, C. P. 173° C.

Crude anthraquinone and anthraquinone derivatives, such as ethyl, propyl, etc., halogen and nitro-anthraquinones obtained by the ring-closure of ortho-benzoyl-benzoic acid and its derivatives, may be purified in the same manner as above described for the purification of methyl-anthraquinone. Other oxidizing agents than those specifically mentioned in the examples may also be used, such as mining salt (KClO3 and KCl) or NaClO3 and NaCl, dichromates, bleach (NaClO), potassium persulfate, chromic acid and hydrogen peroxide and other peroxides and perborates. It has been found that in the use of alkaline bleach on methyl-anthraquinone, a small amount gave considerable improvement in color and crystallizing point, but that if the action is prolonged, the crystallizing point of the final product is lowered considerably.

Other acids may be used in place of sulfuric acid, such as hydrochloric, phosphoric and acetic acid, and the concentrations of the acids and the temperatures used may vary within wide limits.

The concentration of the acid will depend to a great extent upon the nature of the acid and the particular oxidizing agent used. The peroxides and perborates may be used in neutral or slightly acid solutions. It is only necessary that a mild oxidation take place to effect the improvement in the quality of the methyl-anthraquinone, and it is apparent that the oxidation must be carried out under conditions more mild than those leading to the oxidation of the methyl group on the anthraquinone molecule. Temperatures at which this reaction may be carried out may vary from room temperature to the boiling point of the solution in which the anthraquinone is suspended. The concentration of sulfuric acid when used may vary from about 10% to about 40%, the lower percentages being preferred.

The methyl-anthraquinone may be treated with the oxidizing agent in the diluted ring-closed mass prior to separation or it may be separated out and the impure filter cake resludged in the oxidizing solution. Methyl-anthraquinone prepared by other methods than the ring-closure of methyl-ortho-benzoyl-benzoic acid, and which is still below the required standards of purity, may be further purified by this procedure. This method is also applicable for the purification of crude anthraquinone products obtained from other types of ring-closure which do not utilize sulfuric acid, such as for example, products obtained by the use of phosphorous pentoxide or by the action of aluminum chloride upon acid chlorides of ortho-benzoyl-benzoic acid derivatives.

What I claim is:

1. In the purification of 2-methyl-anthraquinone, the step which comprises treating it with a water soluble oxidizing agent under conditions more mild than those leading to the oxidation of the methyl group.

2. In the purification of 2-methyl-anthraquinone, the step which comprises heating it in an aqueous suspension with a water soluble oxidizing agent under conditions more mild than those leading to the oxidation of the methyl group.

3. In the purification of 2-methyl-anthraquinone, the step which comprises heating it while suspended in dilute sulfuric acid with a water soluble oxidizing agent under conditions more mild than those leading to the oxidation of the methyl group.

4. In the purification of 2-methyl-anthraquinone, the step which comprises heating it in a dilute sulfuric acid suspension in the presence of a water soluble oxidizing agent at temperatures not substantially above the boiling point of the solution.

5. In the purification of 2-methyl-anthraquinone, the step which comprises heating it in the sulfuric acid suspension in the presence of a water soluble oxidizing agent at temperatures not substantially above the boiling point of the solution, the concentration of the sulfuric acid used being between 10% and 40%.

LOUIS SPIEGLER.